United States Patent

Wiener et al.

[11] Patent Number: 6,033,287
[45] Date of Patent: Mar. 7, 2000

[54] METHOD OF FINISHING THE HARDENED TEETH OF A BEVEL GEAR WHEEL

[75] Inventors: Dieter Wiener; Gerhard Russeler, both of Ettlingen, Germany

[73] Assignee: Klingelnberg Sohne GmbH, Remscheid, Germany

[21] Appl. No.: 08/945,715

[22] PCT Filed: May 10, 1996

[86] PCT No.: PCT/EP96/02019

§ 371 Date: Nov. 5, 1997

§ 102(e) Date: Nov. 5, 1997

[87] PCT Pub. No.: WO96/35543

PCT Pub. Date: Nov. 14, 1996

[51] Int. Cl.$^7$ .................................................. B24B 49/00
[52] U.S. Cl. ................................ 451/5; 451/47; 451/161; 451/57
[58] Field of Search ................................ 451/47, 57, 65, 451/362, 161, 5

[56] References Cited

U.S. PATENT DOCUMENTS

| | | |
|---|---|---|
| 2,279,216 | 4/1942 | Way . |
| 3,712,000 | 1/1973 | Spear ........................................ 51/287 |
| 3,909,990 | 10/1975 | Tersch . |
| 4,981,402 | 1/1991 | Krenzer et al. ........................... 409/26 |
| 5,116,173 | 5/1992 | Goldrich . |
| 5,168,661 | 12/1992 | Pedersen et al. ......................... 51/285 |
| 5,310,295 | 5/1994 | Palmateer, Jr. et al. .................. 409/13 |
| 5,580,298 | 12/1996 | Stadtfeld ...................................... 451/1 |
| 5,662,514 | 9/1997 | Masseth et al. ............................. 451/5 |
| 5,800,103 | 9/1998 | Stadtfeld et al. ......................... 409/27 |

FOREIGN PATENT DOCUMENTS

| | | |
|---|---|---|
| 0 229 894 | 7/1987 | European Pat. Off. . |
| 34 25 800 | 1/1986 | Germany . |
| 37 07 664 | 10/1988 | Germany . |
| 38 26 029 | 7/1990 | Germany . |
| 43 13 533 | 10/1994 | Germany . |
| 195 17 358 | 10/1996 | Germany . |
| 658 418 | 11/1986 | Switzerland . |

OTHER PUBLICATIONS

"Spiralkegelrad–Walzschleifmaschine WNC 30", Oerlikon Geartec AG, Switzerland.

"CNC–Controlled Spiral Bevel Gear Grinding Machine WNC 80", Klingelngerb Sohne, Germany.

*Primary Examiner*—Timothy V. Eley
*Assistant Examiner*—Dung Van Nguyen
*Attorney, Agent, or Firm*—McCormick, Paulding & Huber LLP

[57] ABSTRACT

In a process for finishing the hardened teeth of a bevel gear wheel by grinding after hardening, the ground teeth are fine-honed, this procedure being carried out in the same chucking as the preceding grinding. A machine especially suitable for this procedure has a chucking device for the bevel gear wheel (12) and a double machining head for mounting two machining tools, namely a grinding wheel (26) and a honing wheel (28). The bevel gear wheel (12) to be machined is preferably a pinion, and accordingly the honing wheel (28) is a bevel gear-type machining tool. Pairing the ground and honed pinion (12) with a bevel gear which has been only ground results in a good noise standard, and the lapping required for hypoid gears manufactured in the traditional way, with its associated drawbacks, is unnecessary.

1 Claim, 8 Drawing Sheets

The invention relates to a method for finishing the hardened gear teeth of a bevel gear by grinding following hardening and subsequent fine-machining of the ground gear teeth, to a machine for executing the method, and to the method of using a bevel gear with hardened and fine-machined gear teeth by being paired with a second bevel gear having gear teeth which have only been finished by grinding following hardening or having gear teeth which have also been fine-machined.

METHOD OF FINISHING THE HARDENED TEETH OF A BEVEL GEAR WHEEL

DESCRIPTION

1. Technical Field

The invention relates to a method for finishing the hardened gear teeth of a bevel gear by grinding following hardening and subsequent fine-machining of the ground gear teeth, to a machine for executing the method, and to the method of using a bevel gear with hardened and fine-machined gear teeth by being paired with a second bevel gear having gear teeth which have only been finished by grinding following hardening or having gear teeth which have also been fine-machined.

2. Background Art

It was possible to achieve very great accuracies in the production, along with tolerable processing times, by grinding bevel gears with spiral teeth. The great accuracies have an advantageous effect on the kinematic accuracy of the gears and on their load-carrying ability. It is also possible to achieve improvements in noise reduction by the optimal design of the bearing pattern (ease-off topology). This applies to the conventional construction of gears, in particular to manufacturing gears for trains, trucks and buses.

A high degree of noise reduction is achieved in passenger car gears with offset axles (so-called hypoid gears) by means of conventional bevel gear manufacturing, i.e. by milling, hardening and lapping of the gear teeth. Hypoid wheels for passenger cars are generally distinguished by a very large axle offset. This results in a very high sliding speed over the entire flank area, which is especially advantageous for the lapping process. Furthermore, passenger car gears are produced in very large numbers, so that it is possible to optimize the process. It is therefore understandable that by means of the conventional production by milling, hardening and lapping a noise standard has been achieved today with these gears, which up to now had been difficult to attain in production line manufacturing of such gears by the grinding process.

In accordance with EP 0 229 894 B1, a known process of hypoid gear manufacturing which has proven itself economically and qualitatively, comprises gear cutting by milling or cutting, case-hardening and lapping in batches. In this case a gear set generally consists of respectively a pinion gear and a ring gear, which must be identified in pairs during lapping for subsequent mounting. The unavoidable distortion during hardening and the resultant loss in quality always cause difficulties here. Even though individual contact errors are rectified by lapping in pairs in order to improve quiet running of the gear sets in addition to improving the surfaces of the sides of the teeth, concentricity errors and eccentricity remain. If such concentricity errors and eccentricity cannot be tolerated, other fine-machining processes must be employed, for which numerous examples are recited in EP 0 229 894 B1. Thus, during large production line manufacturing of gears, in particular for passenger cars and trucks, spur gears, for example, are mainly shaved and subsequently hardened following soft milling (pre-cutting of gears). The quality achieved with this is sufficient to meet the requirements, because the distortion during the hardening of spur gears is small. Bevel gears with spiral teeth are produced as indicated above and are mounted in pairs. However, the fixed pairing of the pinion and the ring gear of the bevel gear sets is to be omitted to increase efficiency, i.e. the distortion due to hardening must be eliminated in the course of fine-machining or finishing of the gear teeth. To this end, EP 0 229 894 B1 discloses a continuous grinding process, by means of which the efficiency as well as additionally the quality of bevel gears is advantageously affected, in that the effects of the distortion due to hardening, as well as contact and concentricity errors and eccentricity, are eliminated to a great extent, so that the identification of pairs of pinions and ring gears and their storage can be omitted. But the very high noise standard which can be achieved in the course of the conventional bevel gear production described at the outset by means of milling, hardening and lapping cannot be achieved either with this continuous grinding process. The difficulties present in achieving this noise standard which, in connection with hypoid gears for passenger cars is achieved by grinding, and to exceed it, if possible, will be explained by means of an example, for which reference is made to FIGS. 1 to 4.

The ring gear and pinion of the hypoid wheel set of a passenger car were ground on a spiral bevel gear generating grinding machine of the type WNC30 of Oerlikon Geartec AG, Zürich (see the corresponding company prospectus WNC30), and were tested on the bevel gear testing machine Spiromat T20 of the same company (see the corresponding company prospectus T20). The diagrams in FIGS. 1 to 4 show the results of acceleration measurements on the said bevel gear testing machine, which were determined by means of the electronic evaluation device "Mess Top", which allows an analysis of the structure-borne noise and a single flank generating test on the same machine. The spectrum of the acceleration level mV is plotted over the frequency in Hz. The gear meshing frequency lies at approximately 320 Hz. In accordance with experimental values, the noise behavior is called approximately satisfactory if the level is located inside the vertical bars drawn in the diagrams. The basic principle of this measuring process is based on an analysis of the structure-borne noise by means of a seismic sensor and is described in detail in the company publication "Oerlikon Spiromatic contex T20 CNC Kegelradtester, Einflankenwälzprüfung und Körperschallanalyse" [Oerlikon Spiromatic contex T20 CNC Bevel Gear Tester, Single Flank Generating Testing and Analysis of Structure-Borne Noise], December 1990, 9202/WA 410 935d, particularly on pages 11 and 12. With a pairing of ground wheels, such as the one measured, the tooth engagement frequency and the 1st and 2nd harmonic of the tooth engagement frequency are generally critical.

FIG. 1 shows the result of a first optimization. The excitation by means of the tooth engagement frequency lies inside the bars, but on the traction side (drive, upper diagram) the levels go beyond the drawn-in bars at the 1 st and 2nd harmonic.

FIG. 2 shows that it was possible by optimizing the geometry to mainly clearly improve the excitation with the tooth engagement frequency—from 60 mV on the traction side to less than 20 mV, and from 50 mV on the thrusting side (coast, lower diagram) to approximately 30 mV. However, what remains is a wide scatter band next to the tooth engagement frequency and its harmonics. Normally this scatter band is not unpleasant to the human ear if it is a stochastic, i.e. random noise, such as occurs with lapped gear teeth of higher quality. However, a certain periodicity can be noted in the noise bands of ground gear teeth, which leads to a noise behavior which is felt to be unpleasant.

FIG. 3 shows a wheel set after more elaborate grinding. The periodic noise bands can be clearly distinguished on the thrusting side. This wheel set is also being considered as waste (reject), because the 2nd harmonic exceeds the permissible threshold value at approximately 635 Hz.

FIG. 4 shows that the levels of these scatter bands are drastically reduced by subsequent lapping.

Even if lapping is performed over only a short time, this means that an additional operational step on a separate machine must be performed, with all the disadvantages of lapping, which are described below. Although it would be possible to achieve these results with grinding alone at a high outlay, the grinding times would be too long and reproducibility would not be provided.

A continuous hard fine-machining process for bevel gears and hypoid gears with arbitrary longitudinal tooth shapes is known from DE 43 13 533 A1, which is intended to represent an alternative to lapping. The tools provided with a coating of a hard material are bevel gear-like bodies. In the process the removal of material is achieved by spraying an abrasive medium between the tool and the work wheel. The disadvantages of lapping are that, because of the individual distortion of each bevel gear during hardening, it is not possible to create an even quality and a defined flank geometry, that the grains of hard material of the lapping medium are pushed into the surfaces of the workpieces because of the pressure between the flanks and partially remain there, because of which too extensive start-up wear must be expected when the gear is operated later, and that the two wheels which are lapped at the same time (pinion and ring gear), must remain together as a set or a pair until installation and must be installed in accordance with individually different installation measurements, which generates considerable costs. With the process in accordance with DE 43 13 533 A1, the operation is performed on a grinding device, wherein the working feed can only be achieved by means of generating through the engagement region and wherein lapping agents (oil mixed with grains of hard material) are sprayed into the contact zone. The coating of the tool has a greater hardness than the abrasive particles of the lapping medium, and it is possible for protection of the tool to coat it with an additional protective layer following the coating with an abrasive hard material. Although the process in accordance with DE 43 13 533 A1 achieves the character of a honing process by this, which is a combination of lapping and grinding, it is necessary to accept the above described disadvantages caused by the employment of lapping medium.

From DE 34 25 800 A1 it is known to fine-machine the tooth flanks of bevel gears by honing only, instead of lapping, in order to reduce the noise generation and to increase the load-bearing capacity by means of a better and more even surface. This method has the advantage that the honed bevel gears exhibit a considerably quieter running behavior and are particularly suited for use in gears of motor vehicles, and that the disadvantages of lapping are avoided, i.e. soiling by the lapping medium and the danger that lapping agents adhere to the flanks and, because of abrasion, reach the gear oil and from there the bearings and cause increased bearing wear, as a result of which wrong tooth meshing and thus increased noise and a reduction of the bearing capacity occur. However, with this known method it is necessary to pre-treat the bevel gears very accurately and they cannot have too great a distortion due to hardening, so that the demanded accuracy and low noise can actually be achieved, because a finish processing by finish-honing cannot cause a large removal of material within an acceptable period of time.

It is known from DE 38 26 029 C2 to harden both parts of a pair of bevel gears consisting of pinion and ring gear and subsequently to finish the gear teeth of the one after hardening by strip hobbing and to finish the gear teeth of the other by grinding. In the course of strip hobbing the respective bevel gear is again milled after hardening in order to remove the distortion due to hardening. The finishing of the other gear wheel by grinding is based on the consideration that the pairing of bevel gears with the same surface structure can lead to noise excitation of higher frequencies and as a rule requires later lapping, whereas it is now thought to be possible to achieve noise suppression by means of pairing strip-hobbed gear teeth with ground gear teeth, wherein the one bevel gear has a comparatively smooth and the other bevel gear a comparatively rough surface structure on its flanks. It is disadvantageous in connection with this known bevel gear pair that an additional machine and expensive tools coated with a hard metal are required, by means of which the gear teeth of the one bevel gear are strip-hobbed following hardening. Not only is this connected with increased costs, but it does not assure even quality. Although it is possible by means of the known bevel gear pair to solve the problem of noise generation of ground gear teeth with methods other than lapping or honing, additional costs and the lack of assured reproducibility must be accepted.

DISCLOSURE OF INVENTION

It is the object of the invention to create a method and a machine for executing it, by means of which it is possible to achieve a high standard of noise in connection with bevel gears with ground gear teeth in a reproducible manner and without more elaborate grinding.

With such a method and such a machine, this object is attained in accordance with the invention by the steps and features recited in the claim.

The following important advantages result by means of the method in accordance with the invention and the machine in accordance with the invention created for executing the method:

The grinding process need not be as accurate as the one without honing and can therefore take place faster.

Honing can be performed in the same machine as grinding, i.e. in the same chucking.

The outlay for the machine is not considerably greater than with known grinding machines.

The noise problem is clearly reduced, if not even removed.

Additional chucking, as in connection with lapping with special cleaning or with honing or strip-hobbing in a special machine, is omitted, since honing takes place here as a finishing process in the grinding machine.

Thus, in accordance with the invention it is possible, for example, to grind a pinion of a bevel gear pair on one and the same machine with one processing head, and subsequently to hone the same pinion in the same chucking with the second processing head. Normally it should be sufficient to hone the pinion, since experience has shown that the pairing of two differently worked surfaces is a lowest-noise variant, anyway.

Although a machine tool for fine-machining of the tooth flanks of precut gear wheels is already known per se (DE 37 07 664 C1), which makes it possible to perform fine-machining in one and the same chucking as in the previous grinding process, only spur gears, but not bevel gears, can be finished on this known machine. Furthermore, the fine-machining of the ground gear teeth was performed by polishing, and not honing. The known machine is a generating grinding machine for spiral generating grinding and subsequent spiral generating polishing, wherein the flanks of the spur gear are acted upon by means of a worm-like tool in a generating process during grinding as well as polishing. For this purpose the grinding worm and the polishing worm are arranged in a row on one and the same tool spindle, so that the finishing of the spur gear, i.e. polishing, can take place on one and the same machine subsequently to grinding. The spiral generating grinding takes place in the prestroke at a high rotating speed (for example 10900 rpm), and polishing takes place in the return stroke at the same speed. In this way two equal kinematic spiral generating processes are performed on one and the same machine with the same machine settings, the same movement cycles, with basically the same tools (for spiral generation) and the same cutting mechanisms, which result in surface structures of the same orientation at the tooth flanks.

In contrast thereto, with the method in accordance with the invention for finishing the gear teeth of a bevel gear and with the machine for executing this method, two completely different processing methods are combined with each other, which require completely different machine settings, completely different movement cycles and completely different cutting mechanisms. For this purpose a machine with a dual processing head, i.e. with two separate tool spindles, is employed in accordance with the invention, such as is basically known from the prospectus WNC30 mentioned at the outset. In accordance with the invention, the cup grinding disk on the second tool spindle of the machine is replaced by a honing wheel, and the entire drive mechanism of this spindle is reconfigured in such a way that, instead of the grinding process, the honing process, which is performed at considerable lower rotating speed, can be performed with the second processing head. In accordance with the invention the possibility has been created for the first time to grind as well as finish by honing bevel gears on one and the same machine, i.e. to perform two kinematically completely different processing methods on one and the same machine, for which it was always necessary in the prior art to employ two separate machines. The advantages resulting from honing on the same machine as grinding, i.e. in the course of one chucking of the bevel gear to be finished, have already been explained above.

The special advantages of the bevel gear pair in accordance with the invention are shown particularly with the use of a bevel gear with gear teeth fine-machined by honing together with a second bevel gear with gear teeth which were only finished by grinding after hardening. This can in particular be a bevel gear pair consisting of a ring gear and a pinion.

The running behavior is advantageously affected by means of honing of the teeth of at least one gear of a bevel gear pair, since the surface structure has a different orientation than with grinding or hard milling.

In accordance with the present state of the art it is not yet efficient to hone the ring gear, because the rotating speed of the honing pinion used as the honing tool for this would be too high and would result in too extensive wear of the pinion.

Exemplary embodiments of the invention will be explained in detail below, making reference to the drawings.

BEST MODE FOR CARRYING OUT THE INVENTION

Figure 6:
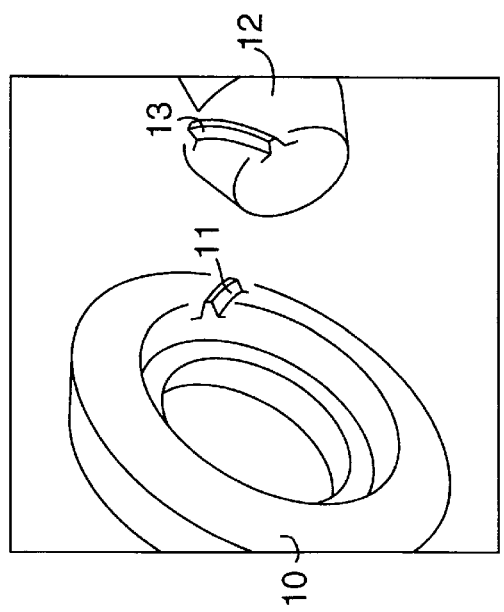
Figure 7:
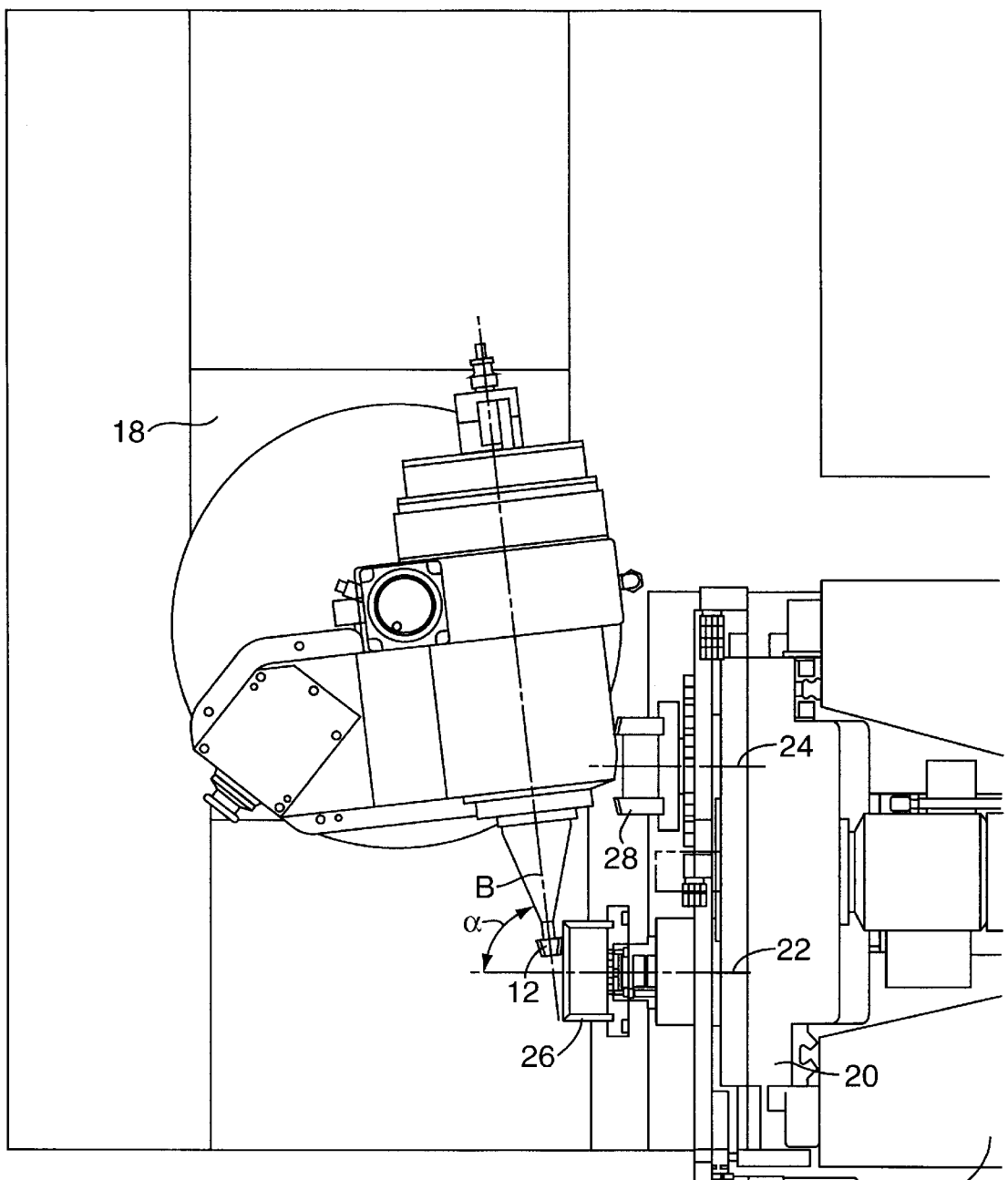
Figure 8:
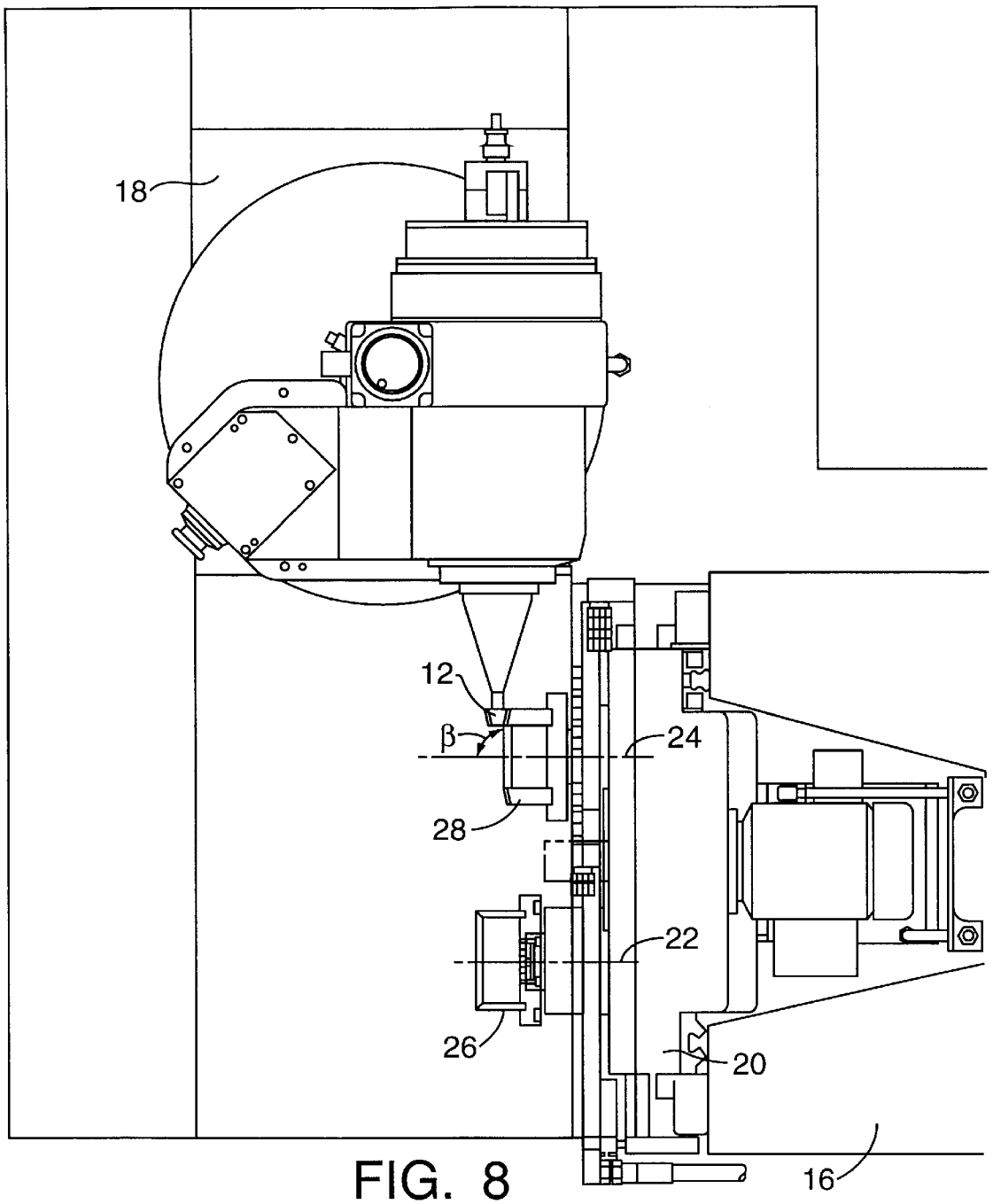

FIG. 6 shows a bevel gear pair which can be produced by means of the process and on the machine described below. It consists of a ring gear 10 with spiral gear teeth and a pinion 12 with spiral gear teeth which, although shown separately from the ring gear 10 in FIG. 6, meshes with it in actual operation. The spiral gear teeth of the two bevel gears 10, 12 are respectively indicated only by a tooth 11 or 13. It is assumed that both sets of gear teeth have been produced by milling and case-hardening. As a rule, both sets of gear teeth are ground on a spiral gear wheel generating grinding machine, such as represented in FIGS. 7 and 8, for removing the distortion due to hardening, as well as concentricity errors and eccentricity and, if necessary, to create a desired ease-off topology and the like. In the example shown, this is the type WNC30 of a generating grinding machine already mentioned at the outset. All profile modifications, such as positive and negative height crowning, defined head and base recesses, longitudinal crowning, radii of roundness of roots of gear teeth and arbitrary corrections of the pressure angle, can be produced without problems on such a machine, as recited in the company prospectus WNC30 at the outset. This machine will be considered in detail in what follows. In accordance with the representation in FIGS. 7 and 8, the machine has a machine housing 16 which is horizontally movable. A generating motion is created during processing by means of the cooperation of a horizontal carriage 18 on the workpiece side and a vertical carriage 20 of the machine housing 16, while the workpiece, the pinion 12 in the illustrated example, rotates around its own axis. The machine has two spindles 22, 24, indicated by their central axes, each of which supports a processing head for chucking a processing tool 26 or 28. The processing tool 26 is a cup grinding wheel. The processing tool 28 is a ring gear-like honing tool, i.e. a ring gear, for example, which can be completely made of corundum or has at least abrasive flanks. The case-hardened gear teeth of the pinion 12 are just being ground by means of the cup grinding wheel 26 in the representation of FIG. 7. The ground gear teeth are subsequently fine-machined. To this end the pinion is moved into the position shown in FIG. 8 by means of the horizontal carriage 18 and brought into engagement with the honing wheel 28, so that the gear teeth of the pinion 12 are now additionally honed in the same chucking as during grinding.

Figure 9:
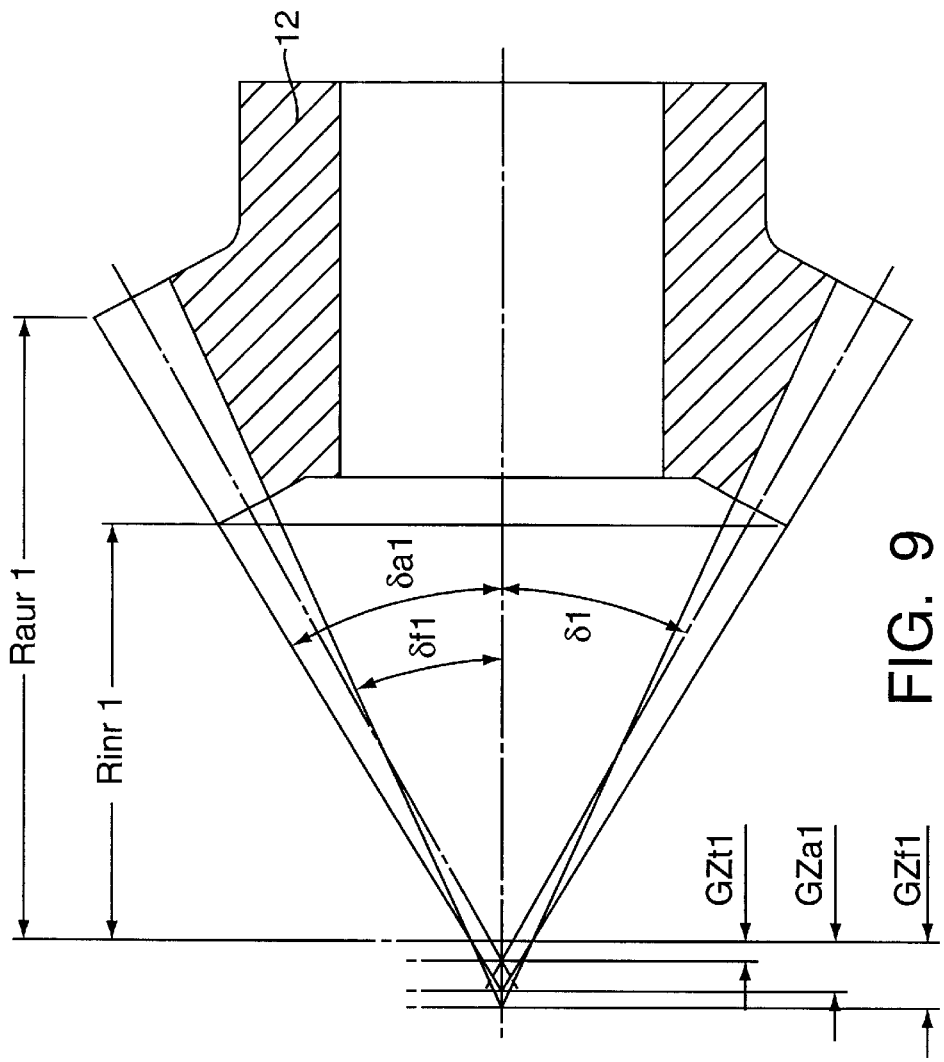

A drive mechanism which is modified in comparison with the drive mechanism of the processing head for chucking the processing tool 26, i.e. a cup grinding disk, is assigned to the processing head for chucking the processing tool 28, i.e. the ring-gear-like honing tool. The modified drive mechanism permits honing performed with different spindle rotating speed than grinding. Furthermore, during or after the displacement of the pinion to be processed between the processing positions represented in FIGS. 7 and 8 with the aid of the horizontal carriage 18, the pinion spindle central axis or the axis of rotation B of the workpiece is pivoted around a vertical axis C, to which the so-called machine basic angle is set. In the processing position in FIG. 7, the pinion spindle central axis B forms a first, preferably variable angle α with the central axis 22 of the cup grinding disk, and in the processing position shown in FIG. 8 for honing, a second angle β with the honing wheel center axis 24. The first angle α is preferably variable in the mean by the so-called root angle δfl (see FIG. 9) of the bevel gear, and the second angle β preferably corresponds to the so-called axial angle of a bevel gear equipped with the pinion 12.

The ring gear 10 is only ground in the customary manner. Such a ring gear with only ground gear teeth is preferably paired with the pinion 12, whose gear teeth have been additionally fine-machined by honing following grinding. The pairing of the different surface structures of the two sets of gear teeth results in the desired noise quality, which will be further discussed below, making reference to FIG. 5.

It is of course also possible to grind and subsequently hone the ring gear and then to pair it with a pinion which had only been ground. In this case the processing tool 28 would be a honing pinion which would have to withstand very high rotating speed so that the entire finishing could be performed in a sufficiently short time. This in turn would be connected with excessive wear of the honing pinion. At present there are no easily available and suitable materials for this for which reason the pairing between the ground ring gear and the honed pinion 12 is preferred. However, for honing the ring gear it would be possible to develop a mating gear with considerably larger dimensions than the pinion, for example by increasing the axle offset and change of the angle of the axle. A mating gear which would have considerably more teeth than the pinion would be created by means of this. In case of the honing of the pinion, the honing wheel with the desired data of the ring gear also represents only one option from the multitude of possible honing tools.

Figure 1:
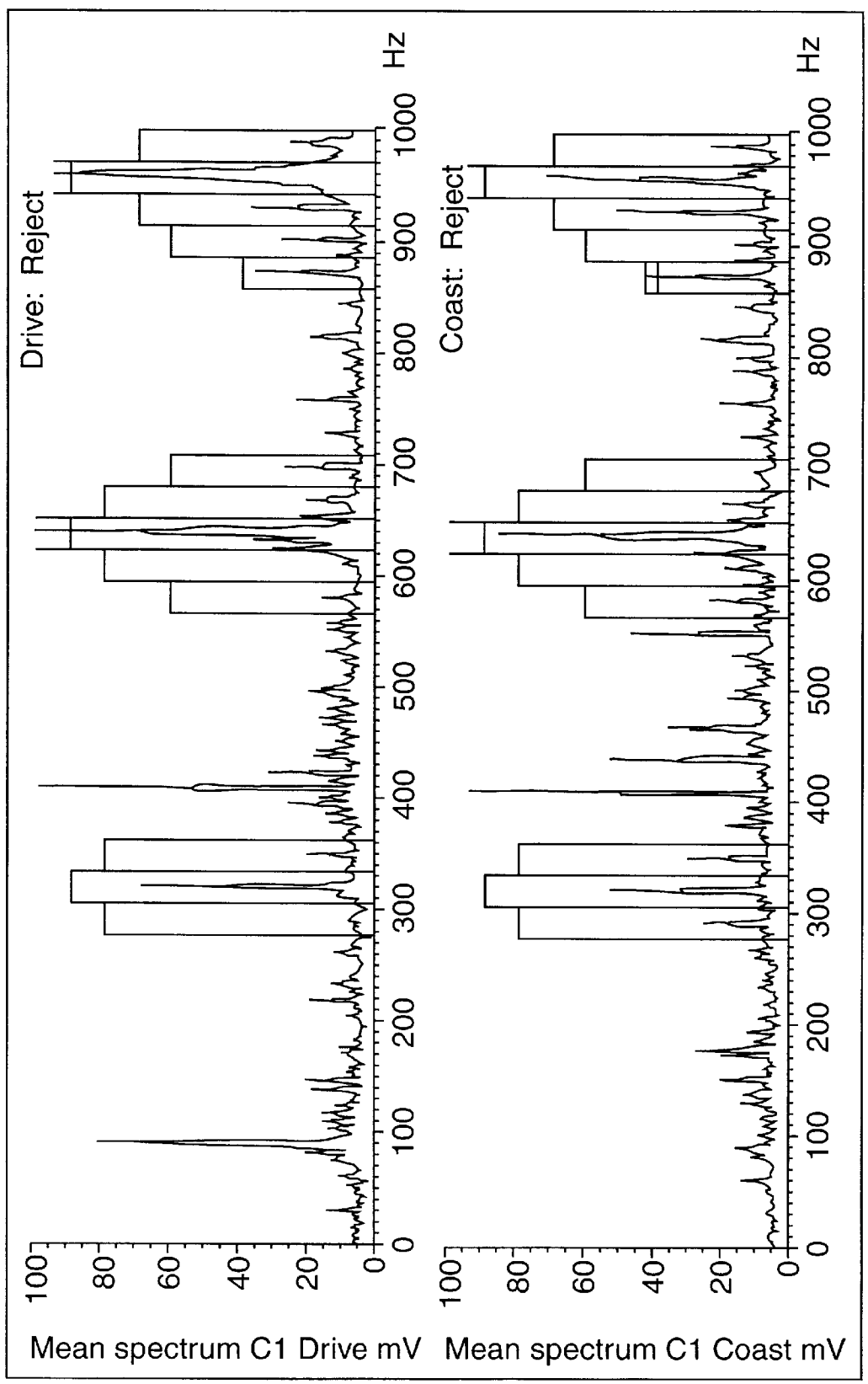
FIGS. 1 to 4, diagrams of the spectrum of the acceleration level over the frequency of known bevel gear pairs with different surface structure pairings to evaluate the noise behavior, FIG. 5, a diagram of the spectrum of the acceleration level over the frequency of a bevel gear pair in accordance with the invention with a surface structure pairing created by grinding or by grinding with subsequent honing, FIG. 6, a bevel gear pair of a hypoid gear, consisting of a ring gear and pinion, FIG. 7, a machine for finishing the pinion of a bevel gear pair by grinding its gear teeth by means of a cup grinding wheel, and FIG. 8, the machine in accordance with FIG. 7 in the course of the subsequent finishing of the same pinion with the aid of a honing ring gear, and FIG. 9, an explanatory sketch in connection with the root angle.
Figure 2:
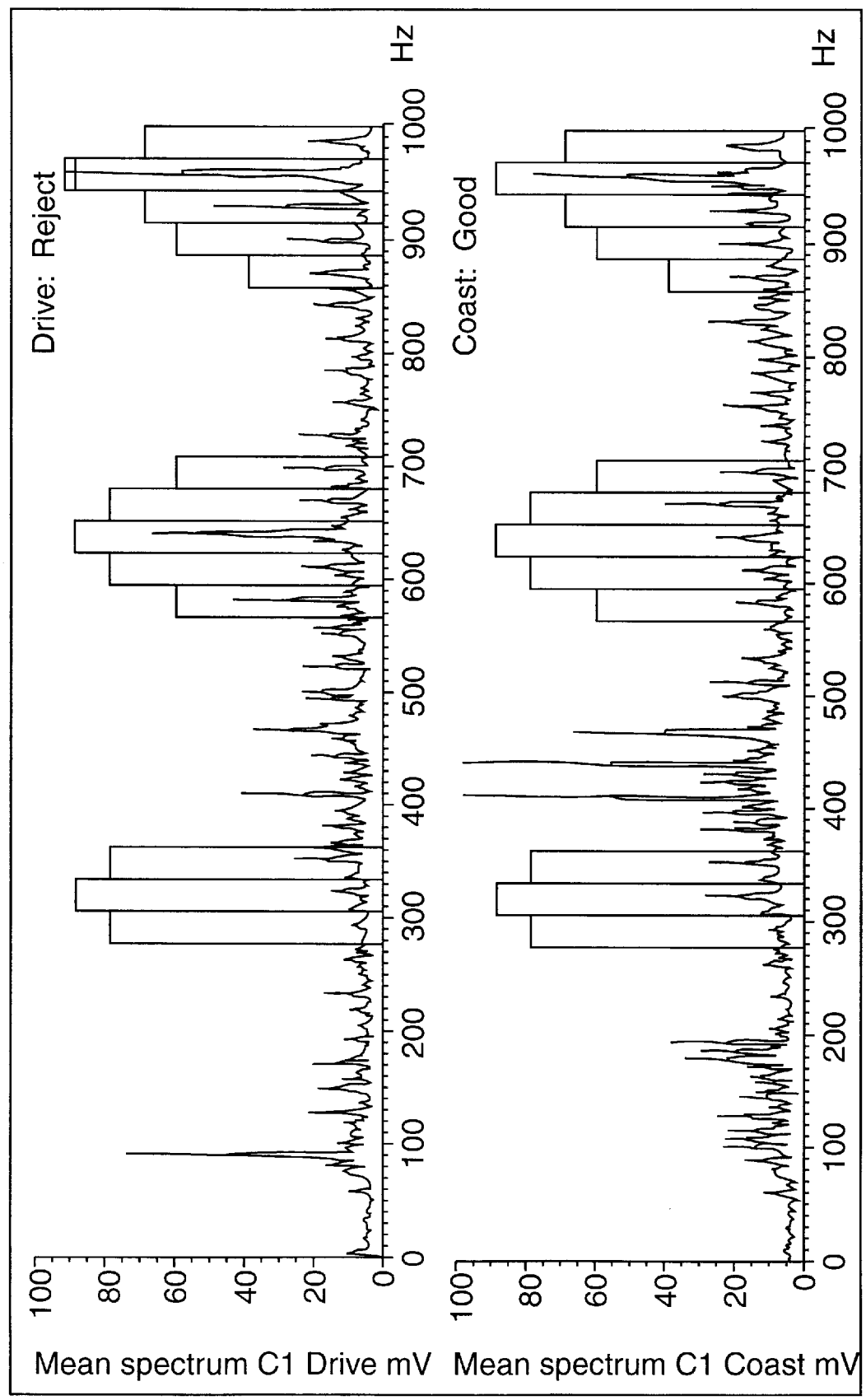
Figure 3:
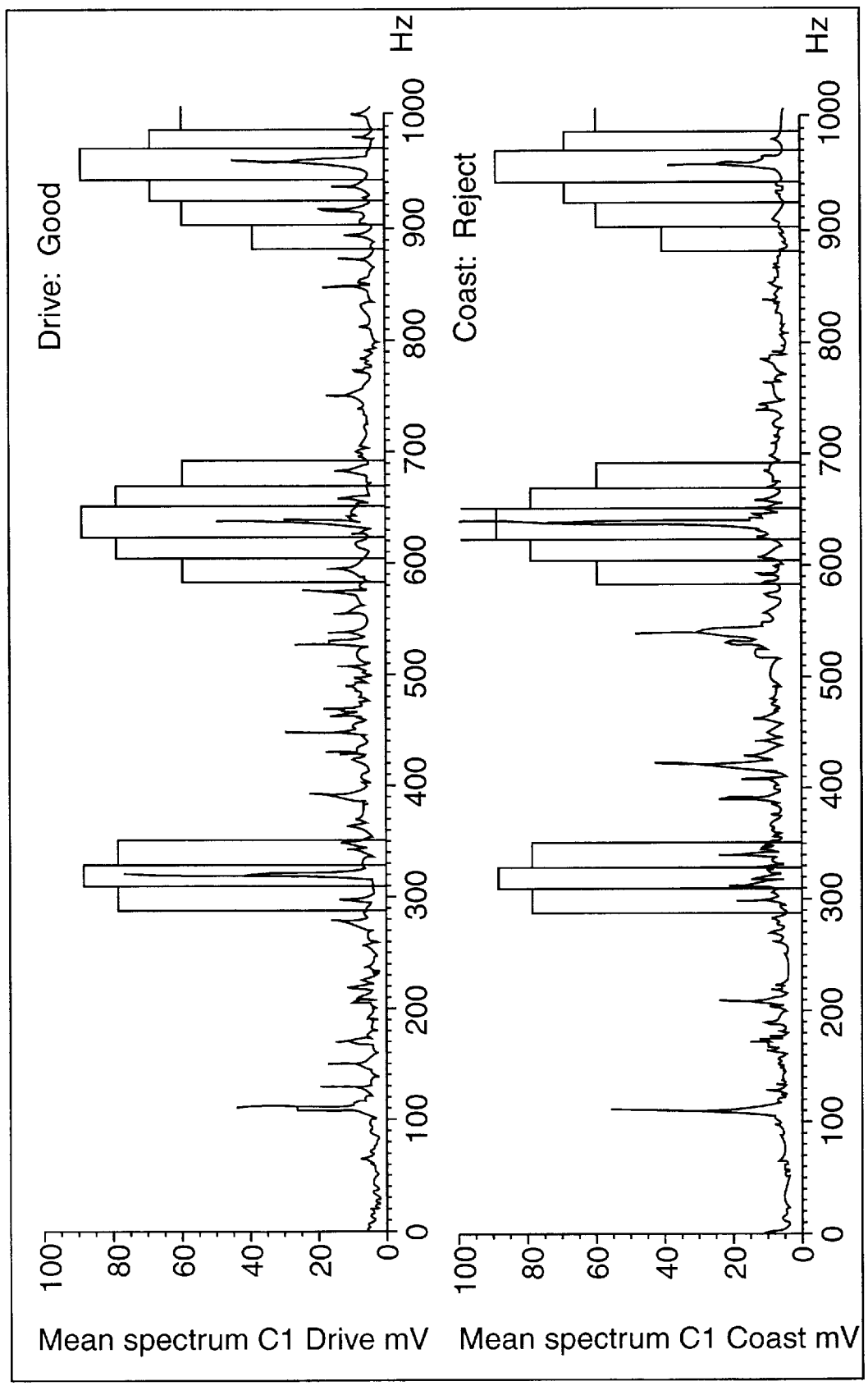
Figure 4:
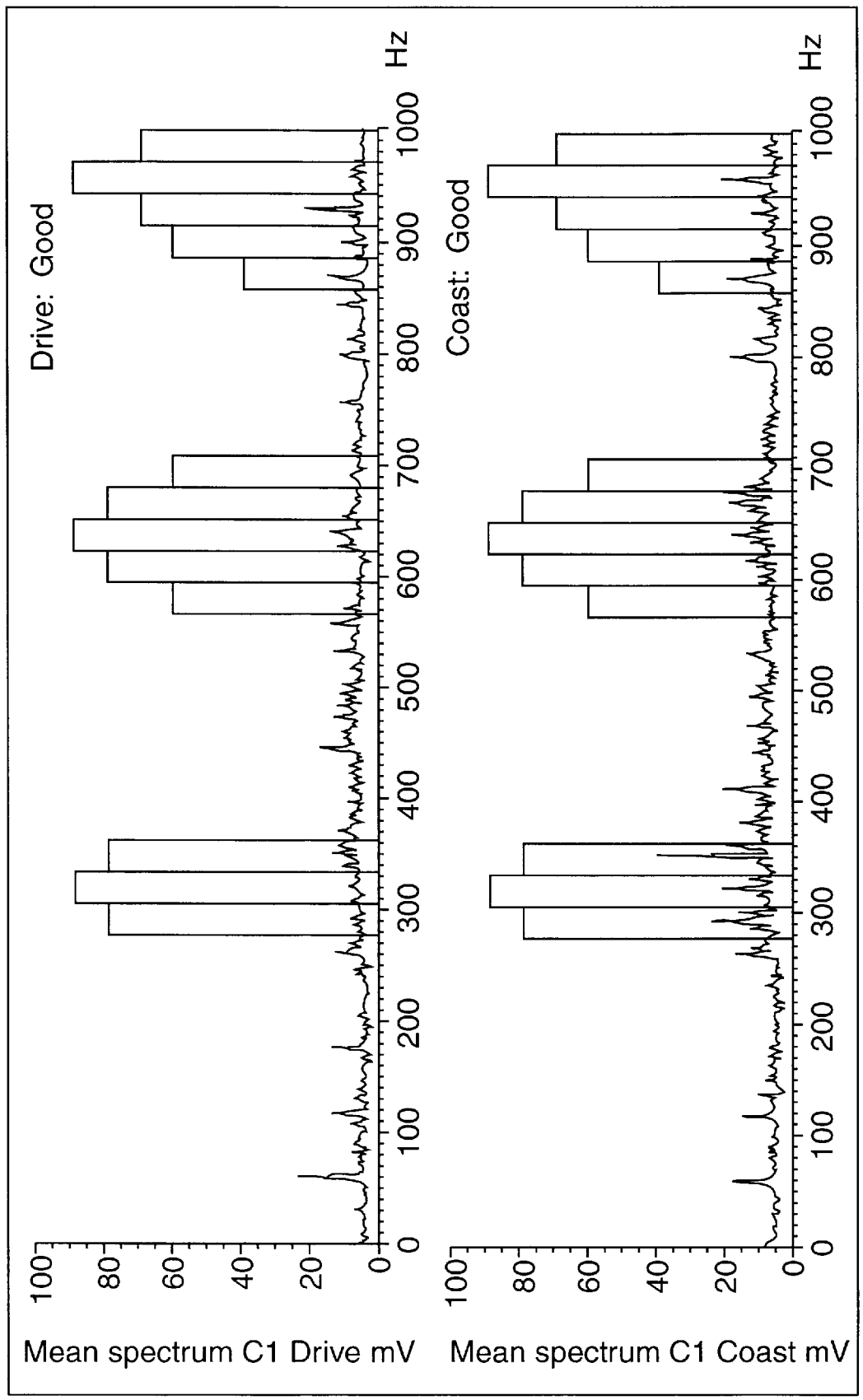

The comparison of the measurement results in accordance with FIGS. 3 and 4 described at the outset has made clear the positive result achieved by grinding and subsequent lapping.

Figure 5:
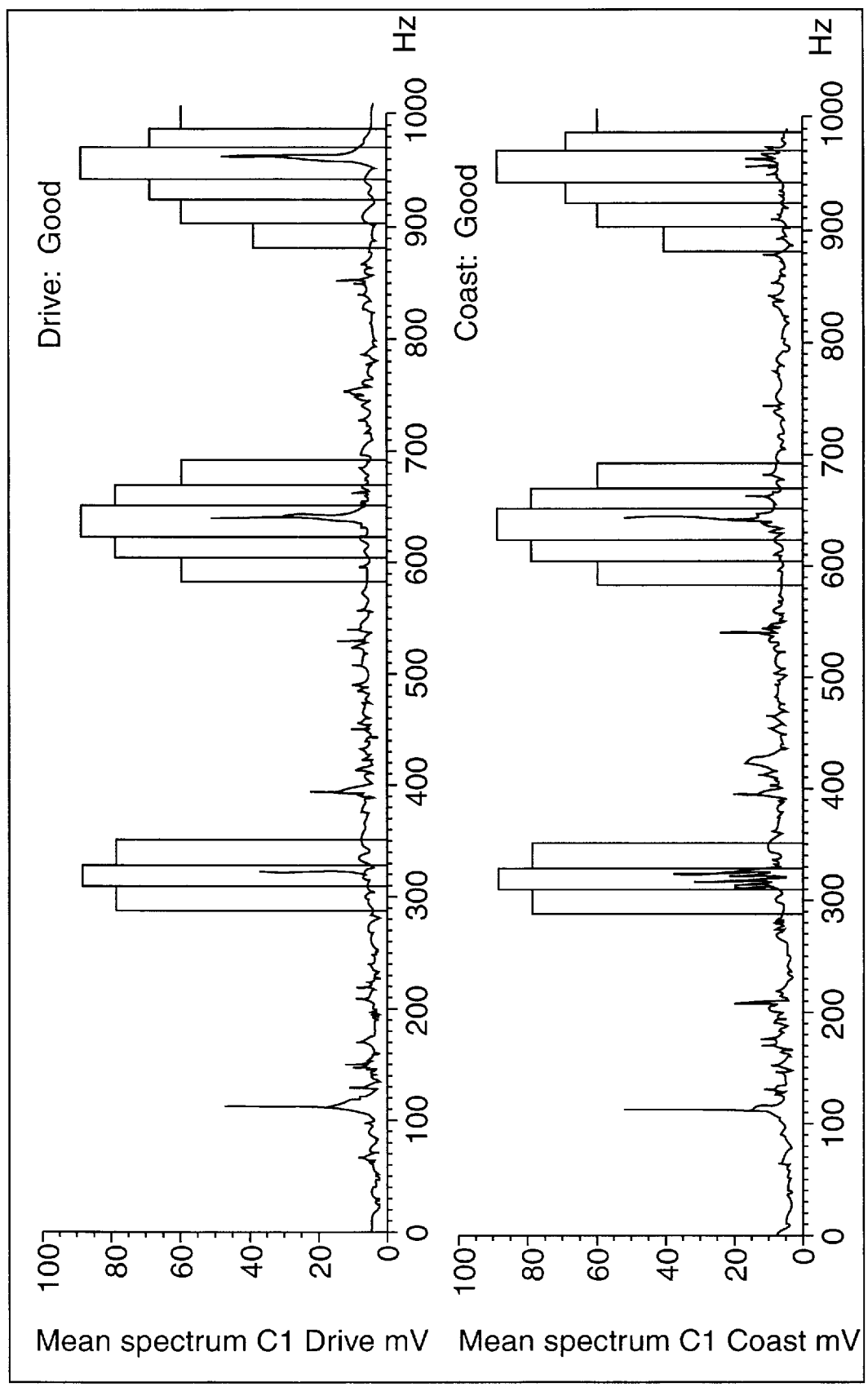

In an appropriate diagram, FIG. 5 shows the result which is obtained when a honed pinion is paired with a ground ring gear. It is possible to see that the noise quality is practically as good as in the case, shown in FIG. 4, of a bevel gear pair in which the gear teeth of both bevel gears are ground and lapped. But the result in accordance with FIG. 5 was achieved in a simpler way, because in the grinding process, which need not be as accurate as the one without honing, the pinion 12 is only additionally honed in the same chucking in the same machine. Furthermore, in this way the disadvantages connected with lapping have been avoided in this way.

We claim:
1. A method for finishing a gear, said method comprising the steps of:

providing a machine including a frame having a tool carriage movably coupled thereto, first and second spindles rotatably mounted on the tool carriage, a gear-shaped honing tool coupled to one of said first and second spindles and a grinding disk coupled to the other of said first and second spindles, a workpiece carriage coupled to the frame adjacent to the tool carriage for movement relative thereto;

providing a controller in communication with said machine and having machine readable grinding and honing data stored therein;

rotatably mounting a gear to the workpiece carriage;

moving the tool and workpiece carriages while simultaneously rotating the grinding disk, thereby causing the grinding disk to engage the gear and generate a predetermined gear tooth profile thereon in response to said grinding data;

moving said tool and workpiece carriages relative to one another and in response to said honing data to cause the gear to engage the honing tool; and independently rotating said gear and honing tool relative to one another, thereby honing flank surfaces on a plurality of teeth defined by said gear.

* * * * *